Oct. 14, 1941.  F. W. ENGSTER  2,259,129
GAS FILLED CABLE
Filed May 2, 1939
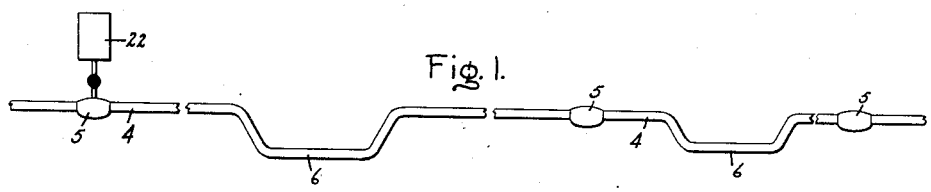
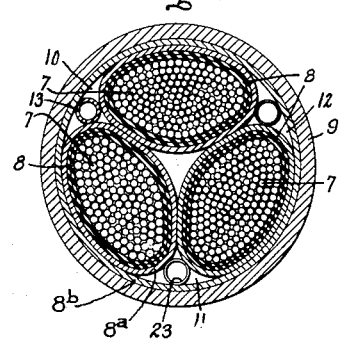
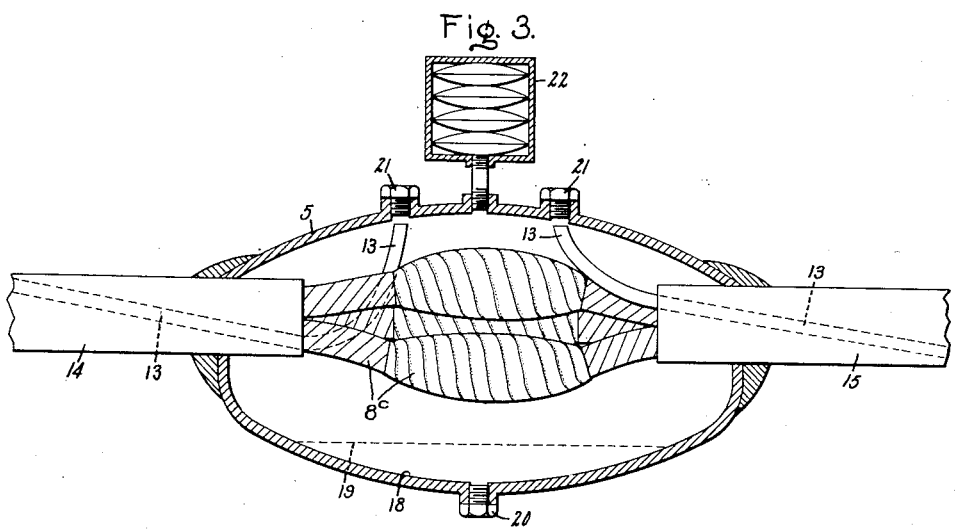
Inventor:
Frank W. Engster,
by Harry E. Dunham
His Attorney.

Patented Oct. 14, 1941

2,259,129

UNITED STATES PATENT OFFICE 2,259,129

GAS FILLED CABLE

Frank W. Engster, Mount Vernon, N. Y., assignor to General Electric Company, a corporation of New York Application May 2, 1939, Serial No. 271,254

1 Claim. (Cl. 174—15)

The present invention is in the nature of an improvement to the gas filled cable system disclosed in the application for patent of George B. Shanklin, Serial No. 224,170, filed August 10, 1938. Structurally, the cable to which my invention is directed comprises individual conductors which are insulated with paper or equivalent material in the usual way, after which they are assembled with a spiral lay, also in the usual way. The insulation is then impregnated with a compound of a character that has little tendency to flow even when heated. Such compound as is not held in the insulation by capillary attraction is permitted to drain therefrom as fully as possible, after which the conductors are enclosed in a fluid tight sheath of lead or equivalent metal. When the conductors are assembled with a spiral lay and enclosed in a sheath, there are longitudinal spirally arranged spaces of approximately triangular shape in cross-section located between the insulation on the conductors and the inner wall of the sheath. Such spaces are known in the cable art as "filler spaces" which in the above described cable system of the Shanklin application are utilized as free gas feed channels whereby the contents of the sheath are exposed to a neutral gas, such as nitrogen for example, under a selected positive pressure.

The gas channels thus formed are of necessity of relatively small cross-sectional area. Although all reasonable efforts are made to drain excess compound from the insulation during manufacturing operations, it sometimes happens that after the cable is put into service, some of the compound oozes out of the insulation due to load conditions and enters the gas feed channels, and if the quantity is sufficient, due to lack of satisfactory drainage of the cable and channels, it collects in one or more low spots in the cable and channels in the form of slugs which restrict the flow of gas through the channels and in some instances may even stop it. Desirably the cable system is so installed that any compound oozing from the insulation tends to flow toward the casings containing the conductor joints which casings act as sumps. However, as is usually the case, the profile of the ground in which the cable is laid is not level and the cable naturally has to follow the general form of the profile. The joints for the cable lengths are usually located in manholes. It may happen that the cable as installed has to be depressed for relatively short portions or lengths below, what for convenience may be termed the normal level due to obstructions in the path of the cable which cannot be removed, such for example as mains for water, gas and sewers. Any change in the location of the cable or parts thereof from a single level results in a tendency for the compound oozing from the cable insulation to form slugs in the low spots. In the event that an obstruction takes place in the cable and in the free feed gas channels at some point remote from the source of gas supply, the gas pressure within the cable between the obstruction and the source of gas supply will not be appreciably changed. On the other hand, the gas pressure in the portion of the cable beyond the obstruction may fall to such a low value, even below atmospheric pressure, that the particular part of the cable in question becomes a potential source of danger.

From what has been said above, it is clear that any obstruction in the cable system affecting the free feeding of gas therethrough, irrespective of the cause thereof, is a potential source of danger to the cable system and is to be avoided.

Broadly, the object of my invention is the provision in a gas filled cable system of the character hereinbefore referred to of a simple and reliable means for ensuring an adequate supply of gas under suitable pressure to all portions of the cable system, whether or not the normal free feed gas channels are wholly or partially restricted at some low point or points within the cable sheath.

More specifically, the object of my invention is the provision in a cable system of the character hereinbefore referred to of a solid walled tube through which gas is free to flow between two spaced points, as joint casings for example, the effect of which is to ensure an adequate supply of gas to the cable parts located on opposite sides of a restriction in the normally open free feed gas channels.

For a consideration of what I believe to be novel and my invention, attention is directed to the accompanying description and the claim appended thereto.

In the drawing which illustrates one embodiment of my invention, Fig. 1 is a diagrammatic representation of a cable as installed with parts thereof at different levels; Fig. 2 is a cross-sectional view of the cable, and Fig. 3 is a diagrammatic sectional view of a joint.

In Fig. 1, 4 indicates lengths or sections of cable, and 5 the casings of the joints between lengths or sections. Both the cable and casings are filled and maintained filled with a neutral gas, such as nitrogen, under positive pressure from a suitable tank or reservoir, with or without automatic pressure control. At 6 are indicated dips or low points in the cable where slugs of compound may be formed. Under some circumstances, the slugs may also form in other parts of the installation depending upon its general arrangement.

Referring to Fig. 2, 7 indicates the conductors of which there are three in the present instance. Each conductor is wrapped with insulation 8 and with an electro-static shield 8a when necessary or desirable. The insulated conductors are held in position, one with respect to the others, by a strong metallic binding band 8b wrapped thereon. The conductors are cabled or assembled with a long pitch spiral in the usual way. As a result of the spiraling, each conductor alternately appears at the bottom of the cable, then at the top and again at the bottom, etc. As shown, the conductors are sector shaped so as to reduce the overall diameter of the cable as much as possible. Other conductor shapes such as round, for instance, can be used, however. Enclosing the conductors is an imperforate sheath 9 desirably but not necessarily of lead. The coverings on the conductors and the inner wall of the sheath define what are commonly known as "filler spaces" to receive fillers of insulating material. Such fillers are not used in the present cable but instead the spiral spaces are utilized to form channels for conveying gas from end to end of the cable. There are three of these gas channels 10, 11 and 12 in the present embodiment of my invention, and they follow of course the spiral arrangement of the conductors, sometimes appearing at the under side of the cable and again at the top and also at intermediate points. The channels serve a double purpose; they convey gas to the contents of the sheath throughout its length, and they also convey compound which oozes out of the insulation to the sumps at the joint casings. In this connection, it is to be noted that the insulation is initially drained of all compound not held therein by capillary attraction before the sheath is applied. In practice, due chiefly to alternate heating and cooling of the cable caused by load changes, a small amount of compound sometimes oozes out of the insulation and enters the channels, and since the latter are spirally arranged, there is a tendency for the compound to collect in one or more of the low spots of the channels as well as in the low spots of the cable itself. A small amount of compound in the channels does no particular harm but if the quantity collected at a low point in the cable is sufficient, it may form what for convenience may be termed slugs which block off the gas channels to a greater or lesser extent and may even close them completely. Looking at the matter from one angle, a sufficient accumulation of compound in one region of the cable will act as a dam. It is highly important that the gas in the cable shall act as fully as possible on the entire contents of the sheath. If the gas pressure is supplied to a length of cable from one end only and a slug stops further flow of gas, it is apparent that the contents of the sheath beyond the slug will suffer accordingly.

To meet the requirements of the cable in service, and overcome the objectionable effects of slugs, an imperforate or solid walled tube 13, desirably of copper, is located in one of the filler spaces of each length of cable, for example space 10, leaving the others to act as free gas carrying channels. The tube need not completely fill the filler space, and where it does not gas may flow through the unoccupied space. During impregnation of the insulation in the factory, and during shipment and installation, the ends of the tube should be sealed to prevent the compound from entering the tube. In order to support the sheath, especially during reeling and unreeling, it is desirable to employ hollow supports 23 located in the filler spaces. Such a support is desirably in the form of a spirally wrapped metal tape extending lengthwise of the cable, there being spaces between the turns to permit the gas to have access to the contents of the sheath. The tube 13 if made sufficiently strong may serve as one of the supports for the sheath or it may be located within one of the spiral supports 23. The tube 13 is shown in section in Fig. 2 and in dotted lines in Fig. 3. The effect of the tube 13 is to shunt or by-pass gas around the slug so that the gas may act on both ends of the slug and thus preserve the cable from injury. This is accomplished by having the tube open at both ends, each end terminating in a joint casing or sump at a level above any compound therein. Gas in the joint casing is free to enter the channels at their respective ends because they terminate therein. In other words, assuming a slug of compound in the cable, gas will be supplied up to the slug from the source and gas will be supplied to the other end of the slug from the same source by first passing through the tube 13 into a joint casing at the farther end then turning, so to speak, and passing backward through the free gas channels to the other end of the slug. Stated another way, after a slug is formed, the parts of the cable length adjacent the slug are supplied with gas from opposite ends of said cable length.

Referring more especially to Fig. 3, 14 indicates the sheath of one cable length and 15 of another. The conductors of the lengths are jointed in the usual way by connectors, and each is insulated by wrapped-on tape to the necessary thickness. Each of the insulated joints is covered with an electrostatic shield 8c forming continuations of the shields 8a. Enclosing the joints is a casing 5 which is secured at its end to the sheaths 14 and 15, as by wipe soldered joints. The ends of the channels in the filler spaces open into the casings and receive gas from the chambers thereof, and under some conditions may discharge compound which has entered them at points remote from the casings. Each casing is purposely made large enough below the level of the cable ends to act as a sump as indicated at 18. 19 serves to indicate the level of the compound which has entered the sump from the open ends of the free feed gas channels. In the bottom of the sump is an opening containing a plug fitting 20 by means of which the sump may be drained as desired and subsequently sealed.

Because of the spiral arrangement of the conductors with the tube 13 in one of the filler spaces, and because the ends of the cables have to be cut to exact lengths before jointing or splicing, it will happen that the tube may appear at the bottom of a cable length, at the top or at some intermediate point thereof. Each tube ordinarily will be of sufficient length to permit of its being bent to its final position with its open ends elevated to prevent compound from entering, but if not, short lengths of tubes may be connected thereto. In the upper side of the casing are openings registering with the upwardly bent ends of the tubes 13 from both connected cable lengths. These openings are provided with plug fittings 21 by means of which access may be had to the open ends of the tubes and by which the openings may be subsequently sealed. It is to be particularly noted that the ends of each tube in each cable length has upturned ends which are located above the level of the compound in the sump so that gas may freely flow from the chamber of one joint casing to that of another remote from the first. Due to this arrangement, gas is by-passed around a low spot in the cable where a plug of compound exists.

Any suitable means automatic or otherwise may be employed for supplying gas under a positive pressure to the cable. As an illustration, a tank 22 is provided for the purpose. Usually a gas pressure of from 15 to 20 lbs. will be sufficient, and such pressure is well within the limits of the sheath to injury therefrom.

What I claim as new and desire to secure by Letters Patent of the United States, is:

A cable installation comprising jointed lengths of conductors, a body of permeable insulation for each conductor, impregnating compound for the bodies normally confined within the outer surfaces thereof but from which it may ooze due to load temperatures, a sheath for each length, a chambered joint casing sealed at its ends to adjacent sheaths, the casing forming a sump below the conductors and having an opening in its upper wall, a movable closure for the opening, a channel in each conductor length opening into the casing above the sump for conveying gas and receiving compound oozing from the bodies, a solid wall gas containing tube in each length, each having an open end within the casing terminating above the level of any compound in the sump for by-passing the contents of the channel, the end of one of the tubes being directly under said opening in the casing and through which it is accessible from the outside of the casing when the closure is temporarily removed, and means for supplying insulating gas to the chambered casing and maintaining it under positive pressure.

FRANK W. ENGSTER.